Oct. 10, 1944.  H. N. OTT  2,360,268
MICROSCOPE
Filed June 23, 1943  3 Sheets—Sheet 1

INVENTOR
Harvey N. Ott
BY
Parker Rochusen & Farmer
ATTORNEYS

Oct. 10, 1944.  H. N. OTT  2,360,268
MICROSCOPE
Filed June 23, 1943  3 Sheets-Sheet 2

INVENTOR
Harvey N. Ott
BY
Parker, Prochnow & Farmer
ATTORNEYS

Oct. 10, 1944. H. N. OTT 2,360,268
MICROSCOPE
Filed June 23, 1943 3 Sheets-Sheet 3
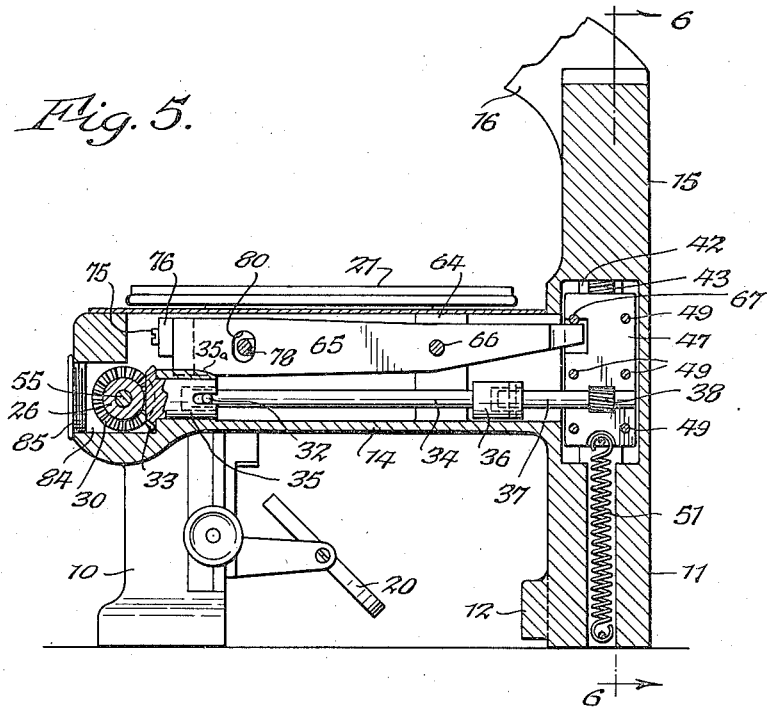
Fig. 5.
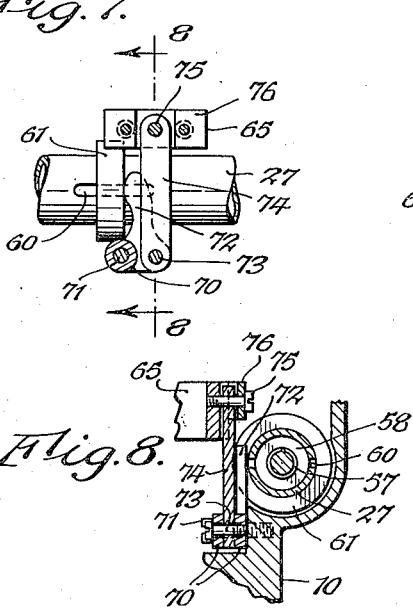
Fig. 7.
Fig. 8.
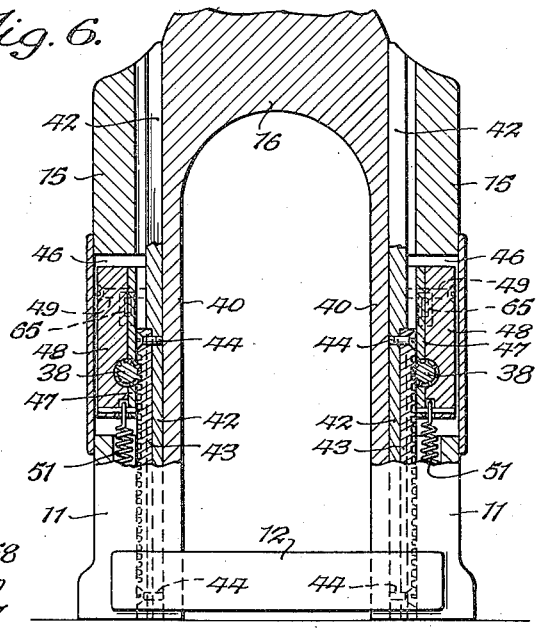
Fig. 6.
INVENTOR
Harvey N. Ott
BY
Parker, Prochnow & Parker
ATTORNEYS Patented Oct. 10, 1944

2,360,268

UNITED STATES PATENT OFFICE 2,360,268

MICROSCOPE

Harvey N. Ott, Buffalo, N. Y.

Application June 23, 1943, Serial No. 491,932

21 Claims. (Cl. 88—39)

This invention relates to improvements in microscopes and more particularly to means for adjusting the body tube of the microscope relatively to the object or specimen. The invention relates more particularly to microscopes of the type in which the arm of the microscope is located on the side of the microscope remote from the user, to give the user a clear view of the object or specimen on the stage.

One of the objects of this invention is to provide microscopes of this type with means of improved construction for effecting the fine and coarse adjustments of the body tube relatively to the specimen.

Another object is to provide a microscope with fine and coarse adjustments of improved construction in which the two adjustments are effected by means of concentric shafts and adjusting buttons or disks located in close proximity to each other and rotatable about a common fixed axis.

A further object is to provide adjustments of this kind on the front portion of a microscope of the type in which the arm which supports the body tube is on the rear of the microscope.

It is also an object of this invention to provide a fine adjustment for a microscope which includes a lever extending from the front to the back of the microscope for transmitting motion from the fine adjustment buttons to the arm of the microscope. A further object is to fulcrum this lever so that the motion of the fine adjustment mechanism at the front of the microscope is reduced by the lever in transmission to the arm of the microscope. A further object is to provide a fine adjustment of this type in which the lever is bifurcated with arms extending along opposite sides of the optical axis of the microscope.

It is also an object of this invention to provide a microscope having a coarse adjustment which includes a pair of shafts extending from the front to the back of the microscope and arranged at opposite sides of the optical axis of the microscope. It is also an object to provide these shafts with universal joints and connected with adjustable or floating bearing blocks, the movements of which are effected by the fine adjustment mechanism.

Another object is to provide a single bearing connection between the body tube and the base of the microscope, which bearing serves for effecting both the fine and coarse adjustments.

Other objects and advantages of this invention will appear from the following description and claims.

Figure 1:
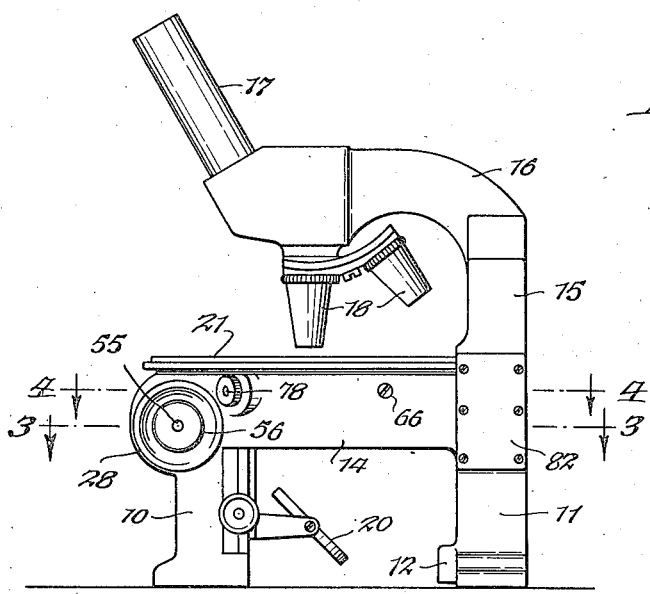
Fig. 1 is a side elevation of a microscope embodying this invention.
Figure 2:
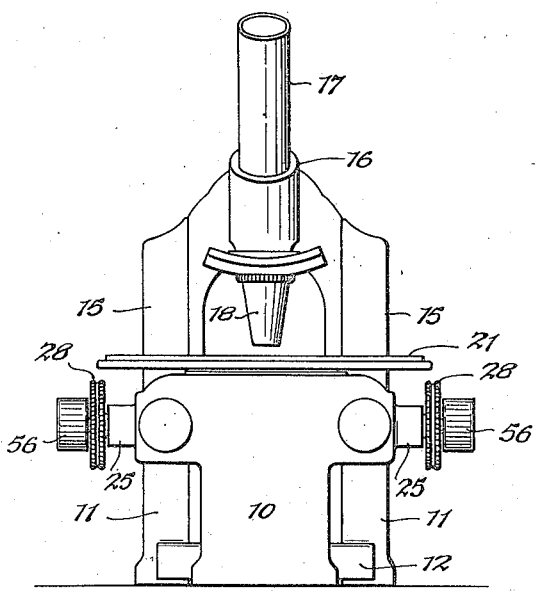
Fig. 2 is a front elevation thereof.
Figure 3:
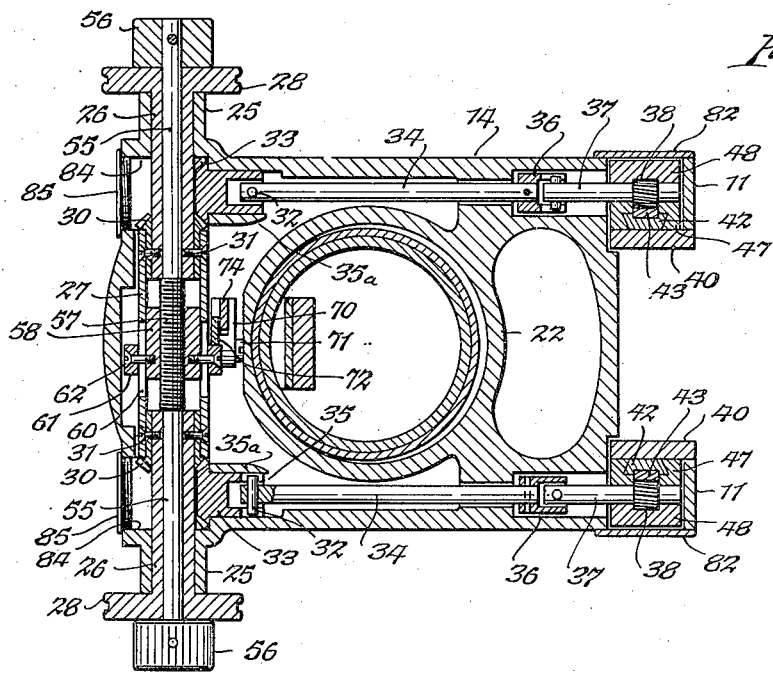
Figure 4:
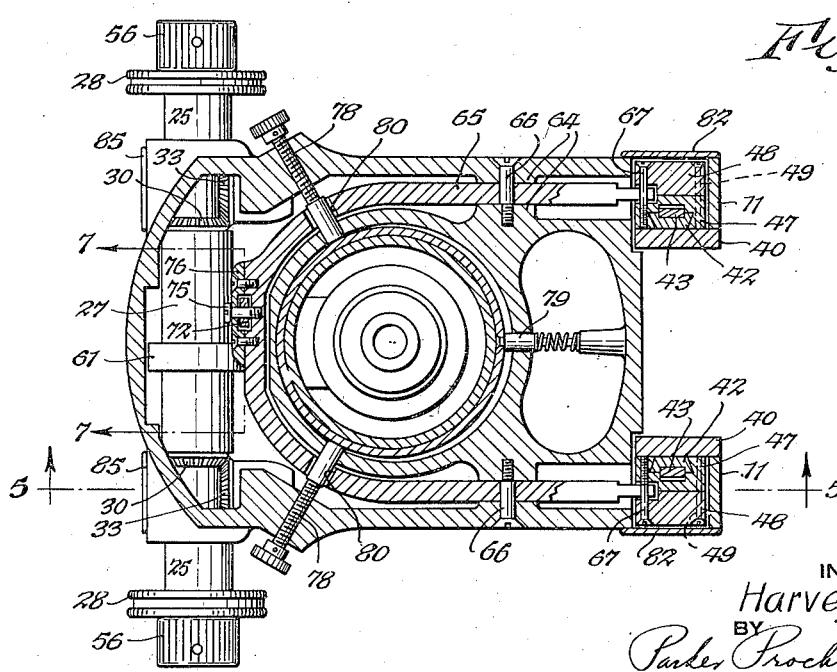

Figs. 3 and 4 are sectional plan views thereof, on an enlarged scale, taken respectively on lines 3—3 and 4—4, Fig. 1.

Fig. 5 is a fragmentary sectional elevation thereof, on line 5—5, Fig. 4.

Fig. 6 is a fragmentary sectional elevation thereof, on line 6—6, Fig. 5.

Fig. 7 is a fragmentary sectional elevation thereof, on line 7—7, Fig. 4.

Fig. 8 is a transverse section thereof, on line 8—8, Fig. 7.

The microscope shown by way of example in the drawings is of the reverse type, in which the arm which supports the microscope body tube is located at the rear of the microscope, or in other words, at the side of the microscope remote from the user, so that the user can more readily see the object or specimen on the stage. It will be obvious, however, that this invention is not limited to the particular microscope shown in the drawings, since some of the features of this invention may be employed in connection with microscopes of different types, such for example as shown in my copending application Serial No. 491,931, filed June 23, 1943, which application also contains claims applicable to some features of the microscope herein shown and described.

The microscope illustrated by way of example in the drawings includes a base or frame having a front leg or column 10, a pair of legs 11 at the rear of the microscope which may, if desired, be connected by a cross member or brace 12 secured to or formed integral with the bottoms of the legs. The upper end of the front leg is connected with the rear legs by means of horizontally extending side members or beams 14 which are spaced apart and which may be formed integral with the front and rear legs of the microscope, thus forming a rigid base or frame for the instrument. The rear legs 11 preferably have upwardly extending portions 15 which extend above the horizontal members 14, to form elongated bearings on which the adjustable arm 16 of the microscope is guided for vertical adjustment. This arm supports the usual body tube 17 which may be monocular or binocular and of any suitable or desired form and which may cooperate with one or more objectives 18 also supported on the arm 16. The usual mirror 20 may be mounted on the rear face of the front leg or standard 10 so as to receive light through the space between the rear legs 11. 21 represents the stage of the microscope which may also be of any suitable or desired form, that shown being of the circular type, and is securely mounted between the side frame members 14 of the base, and an integral transverse web 22 connecting the two side frame members. The condenser and its mounting may also be of any usual or desired construction, and the usual adjustments for the condenser may be mounted on the rear face of the front leg 10, but since these adjustments, as well as the condenser and lens systems in the body tube may be of any suitable type heretofore used, they are not herein described, and are omitted from the drawings for sake of clarity. It will be noted that the space between the rear legs, through which light passes to the mirror 20, extends above the stage of the microscope in such a manner that ample light may pass to the mirror 20 for reflection through the condenser to the specimen.

In microscopes of this type as heretofore constructed, the fine and coarse adjustments for the objective were generally located on the rear portion of the microscope and generally above the stage, which was objectionable for a number of reasons. In order to focus the microscope, it was necessary for the user to reach across the microscope to find these fine and coarse adjustments while he was looking through the body tube of the microscope, and consequently, he had to grope for the adjustment buttons or disks, and furthermore, had to hold his hand and arm in an elevated position, which eventually became tiresome. Furthermore, delicate adjustments necessary for setting the microscope for an exact focus could not well be made with the hand and arm unsupported or not steadied, particularly if the hand and arm became somewhat fatigued. Also when the operator reaches toward the back of the microscope, his arm shuts off some light coming from the side of the instrument. It is, consequently, important in order to obtain the best results from the microscope that the adjustable buttons be so located on the microscope that they may be actuated while the user's hand or hands rest upon the table or support on which the microscope stands, and it is also desirable that these adjustments be arranged as near as possible to the user of the microscope. For this reason, I have mounted the adjustment shafts and buttons or disks on the front leg of the microscope below the level of the stage. Since most of the adjustments must be made while the observer is looking through the body tube, it is also very desirable that these adjustment buttons be located in fixed positions so that they can be easily and readily found by the user of the microscope without removing his eye from the body tube. For this purpose, I have mounted the coarse and fine adjustments to revolve about a fixed axis.

In the particular embodiment of the invention illustrated in the drawings, I form the upper portion of the front leg with a hollow enlargement to receive some of the parts of the fine and coarse adjustment mechanisms and I also form the side members 14 of hollow or trough shape to receive means for transmitting the adjustment to the arm 16 at the rear of the microscope. The upper portion of the front leg of the microscope is preferably provided at opposite sides thereof with laterally extending bosses or projections 25 which may be bored to form bearings for hollow shafts 26 of the coarse adjustment mechanism. These shafts extend into the upper hollow portion of the front leg and the inner portions of these two shafts are preferably connected with each other by suitable means, such as a connecting sleeve 27. These shafts may have adjustment buttons or disks 28 which may be formed integral with the outer ends thereof and these buttons are, consequently, located at opposite sides of the microscope. Since the two shafts are rigidly connected by means of the sleeve 27, it will be obvious that the coarse adjustment may be effected by either button or disk 28.

Each coarse adjustment shaft 26 has a bevel gear 30 secured thereto, the bevel gears shown by way of example in the drawings having sleeves extending about the coarse adjustment shafts 26 and the connecting sleeve 27 extends about these sleeves, so that both the beveled gears and the connecting sleeves may be secured to their shafts by means of screws 31 or other means extending through the two sleeves and having a threaded engagement in the coarse adjustment shaft 26.

Any suitable means may be provided for transmitting motion of the coarse adjustment shafts to the rear of the base of the microscope. In the construction shown for this purpose, the bevel gears 30 mesh with other bevel gears 33, each of which is connected with a shaft 34 by means of a universal joint 35 of any suitable or desired construction, that shown being formed by a hollow cylindrical hub or extension of the gear 33 which has slots therein formed to receive a pin 32 extending through the end of the shaft. The hubs of the bevel gears 33 are journalled in bored-out portions or lugs 35a of the base. The other end of each shaft 34 is connected by means of another universal joint 36 to a shaft 37 which has a gear 38 mounted thereon. The shafts and universal joints connecting them are arranged in the lower portions of the trough-like horizontal connecting members 14. Any other means to transmit the movement of the coarse adjusting buttons to the gears 38 may be provided, if desired, and the universal joint may be omitted and replaced by a single shaft of small diameter connecting the gears 33 and 38, which shaft would be sufficiently flexible to permit vertical movement of about one-eighth of an inch of the gear 38.

The arm 16 of the microscope terminates at its lower end in two upright legs 40 which are guided for vertical movement on the rear legs 11 and their upward extensions 15. Any suitable bearings may be provided, and in the construction shown, the legs 11 and their extensions are provided with dove-tailed grooves formed in the inner sides of these legs, and the legs 40 of the arm 16 have dove-tailed ribs or bars 42, which are preferably secured thereto and which are accurately machined to operate smoothly in the dove-tailed grooves or recesses in the legs 11 and their extensions 15. These ribs or bars are provided with racks 43 which may be formed on the bars 42 themselves or on separate parts secured to the bars, for example, by means of screws 44. The rack teeth of the bars 43 mesh with the gears 38 for effecting the coarse adjustment of the arm 16. In the operation of this coarse adjustment, it will be obvious that, on turning, either or both coarse adjustment buttons 28, the coarse adjustment shafts will through the bevel gears 30 and 33 transmit rotary motion to the shafts 37 which will rotate in opposite directions and rotate the gears 38 meshing with the rack bars 43 secured to the downwardly extending legs 40 of the arm 16, thus raising or lowering the arm 16.

The rear ends of the shafts 37 are journalled in floating bearing blocks which are arranged in recessed portions 46 of the rear legs of the base of the microscope, these recessed portions extending completely through the legs from side to side, so that the dove-tailed bearing grooves in the inner faces of the legs and extensions 15 are interrupted by these recessed portions. These bearing blocks in the recessed portions of the legs are preferably each formed in two parts, one part 47 being provided with a dove-tailed groove similar to the inner faces of the legs 11 and their extensions 15, and in which the dove-tailed bars 42 bear. The bearing for the shaft 37 is formed partly in the part 47 of the block and partly in a part 48 and these two parts of the block may be secured together in any suitable manner, for example, by means of screws 49, see Fig. 4. The parts of the floating bearing blocks are so formed as to frictionally grip the shafts 37 so that the weight of the arm 16 and the parts mounted thereon will not tend to turn the coarse adjustment mechanism. The parts 47 and 48 of the bearing blocks are also recessed to receive the gears 38 and the rack bar 43 with which these gears mesh. These bearing blocks are held in position by means of the fine adjustment mechanism and are moved vertically thereby, as will be hereinafter explained, and consequently, the blocks are preferably urged downwardly into engagement with the fine adjustment mechanism support by means of springs 51 or the like. The adjacent surfaces of the parts 47 and 48 of the blocks may be slightly concave so that they may be deflected or bent by the screws 49 into frictional gripping engagement with the shafts 37, and this bending of the part 47 also causes it to bind on or grip the bar 42. Any other means may be used for frictionally holding the floating bearing blocks on the legs of the arm so that the arm will not be moved down by gravity and by the force of the spring 51.

The fine adjustment mechanism includes a shaft 55 having buttons or disks 56 secured to the opposite ends thereof. This shaft extends through the middle portions of the hollow coarse adjustment shafts 26, and in the space between the inner ends of these shafts, the fine adjustment shaft is provided with a threaded portion 57 which engages a nut 58 arranged within the cylinder or sleeve 27 which connects the two coarse adjustment shafts 26. The fine adjustment nut 58 is held against turning, and is, consequently, adjustable lengthwise of the fine adjustment shaft, the extent of movement of this nut being from the inner end of one coarse adjustment shaft to the inner end of the other coarse adjustment shaft.

In order to transmit the motion of the fine adjustment nut 58 to the exterior of the connecting or coupling sleeve 27, this sleeve is provided with a plurality of slots 60 extending lengthwise thereof, and a ring 61 is slidably arranged about the exterior of the connecting sleeve 27 and is rigidly connected to the fine adjustment nut 58 by any suitable means, such for example as screws 62 extending through holes in the ring 61 through the slots 60 and into threaded holes in the fine adjustment nut 58. Since the ring 61 is slidable lengthwise on the outside of the coupling sleeve 27, it will be obvious that as the fine adjustment nut is adjusted lengthwise of the fine adustment shaft, the movement of this nut will be transmitted through the screws 62 to the ring 61 on the outside of the sleeve 27. In the operation of this portion of the mechanism, it will be obvious that when the coarse adjustment shafts are rotated, the fine adjustment shaft 55, buttons 56, fine adjustment nut 58 and ring 61 will turn with the coarse adjustment shafts so that there will be no rotation of the fine adjustment shaft relatively to the nut 58, and consequently, no motion of the ring 61 lengthwise of the shafts, the ring merely turning in a fixed plane. Since, as will be hereinafter explained, fine adjustment of the body tube results from displacement of the ring lengthwise of the shafts, the turning of the coarse adjustment shaft, consequently, will have no effect upon the fine adjustment. When the fine adjustment shaft is turned, the fine adjustment nut 58 will move lengthwise of the fine and coarse adjustment shafts and corresponding movement will be transmitted to the ring 61.

Any suitable or desired mechanism may be provided for transmitting the lengthwise motion of the fine adjustment nut 58 and ring 61 to the arm 16 of the microscope, and in the construction illustrated by way of example, the motion of the ring 61 is transmitted to one end of a lever 65 arranged within the trough-shaped side frame member 14 of the microscope base. The lever 65 is bifurcated or of horseshoe shape so that one leg of the lever is arranged in each trough-shaped side frame member 14. The lever 65 is pivoted at 66 between inwardly extending pairs of guide lugs 64 in the interior of the hollow side frame members 14. The rear ends of the two legs of the lever extend into recesses or notches in the floating bearing blocks formed of the block parts 47 and 48, the ends of the lever in the particular construction illustrated engaging the underfaces of the screws or bearing pins 67 arranged in the bearing blocks. The front end of the U-shaped fine adjustment lever 65 is arranged in the hollow enlarged upper portion of the front leg or pedestal 10.

Motion of the fine adjustment nut 58 and ring 61 may be transmitted to the front end of the fine adjustment lever 65 in any suitable or desired manner, and in the construction shown for this purpose, a bell crank lever 70 is provided, which is pivoted at 71 on a fixed part of the front leg or pedestal of the microscope. This lever has an upwardly extending leg 72, the upper end of which engages a side of the fine adjustment ring 61, see particularly Figs. 7 and 8. The lever has a pivotal connection at 73 with a link 74, the upper end of which is pivotally connected at 75 to the bifurcated fine adjustment lever 65, a strap 76 being secured to the lever 65 and having an offset portion. The link 74 extends between the offset portion of the strap and the level to form a support for the pivot pin 75.

Since the spring 51, supplemented by the weight of the arm 16 and the parts carried thereby, urges the floating bearing blocks in the rear legs and the rear ends of the lever 65 downwardly, the front end of this lever will exert a yielding force upwardly, which acting through the link 74 would tend to swing the bell crank lever 72 against the fine adjusting ring 61. Consequently, this ring need exert pressure against the bell crank lever only in the direction to raise the arm 16 of the microscope.

If the microscope is provided with a circular stage, as shown in the drawings, the stage may be shifted in the usual manner by means of a pair of adjustment screws 78, Fig. 4, which bear against a downwardly extending flange of the stage and which are spaced at approximately 120 degrees from each other and from a spring actuated plunger 79 also acting on this flange of the stage. This adjustment has heretofore been frequently used on microscopes and may be used in connection with my improved microscope, since the lever 65 may be provided with elongated holes or openings 80 therein through which the screws 78 may pass without interfering with the adjustment of these screws or with the movements of the lever 65.

The outer sides of the legs may be provided with cover plates 82 to cover the openings in these legs which are provided for the floating bearing blocks 47 and 48. The bearings in the lugs or bosses 35a may be drilled through openings or holes 84 bored from the front of the microscope and may be of large enough size so that the bevel gears 33 may be inserted through the same. These openings may then be closed by means of suitable caps 85.

By means of the construction described, it will be obvious that the user of the microscope may turn the coarse and fine adjustment buttons with either hand, while his hand or wrist is resting upon the table or support on which the microscope stands. In this manner, more delicate adjustments can be effected, and it is less tiring on the user to make such adjustments. Furthermore, the coarse and fine adjustment buttons or disks revolve about fixed axes so that they always remain in the same relation to other parts of the microscope so that they can be easily found by the user without taking his eye from the body tube. By pivoting the lever 65 with the pivot 66 therefor arranged nearer to the rear end of the lever than toward the front end, a reduction in movement is effected through the medium of this lever, as well as through the bell crank lever 70, so that a coarse screw could be used in the fine adjustment than has heretofore been customary. Furthermore, any errors or inaccuracies in the screw threads of the fine adjustment mechanism would be proportionately decreased in transmission through the levers. By providing the arm of the microscope with two legs spaced apart and actuating both of the legs through both the coarse and fine adjustment mechanisms, a very steady and reliable support for the body tube is produced. The universal joints in the coarse adjustment shafts permit the bearing blocks 47 and 48 to be adjusted vertically by means of the fine adjustment mechanism.

By means of the construction described, the base of the microscope forms a sturdy and rigid support for the stage, so that the object or specimen is not apt to be moved out of focus by pressure applied by the hands of the user to the stage. In some microscopes heretofore devised, the fine adjustment mechanism moved the stage relatively to the body tube of the microscope, but in such microscopes, the user by resting his hand momentarily on the stage, exerted enough force on the stage to move the same sufficiently to move the specimen out of focus. Such difficulty is avoided by means of the construction herein shown, in which the fine adjustment is made on the body tube, thus permitting the stage to be rigidly mounted on the base.

I claim as my invention:

1. A microscope having a frame, a stage on said frame, a body tube, an arm on which said body tube is secured, a double bearing part on said arm cooperating with corresponding bearing parts of said frame for adjustment of said arm relatively to said frame to move said body tube toward and from said stage, the bearing parts on said frame being spaced apart to permit light to pass between them to the underside of said stage, bearing blocks engaging said bearing parts of said arm and frictionally held against movement relatively thereto, a coarse adjustment mechanism for moving said arm relatively to said bearing blocks and said frame, and a single fine adjustment mechanism on said frame supporting both of said bearing blocks and adjustable to move said bearing blocks and arm together relatively to said frame.

2. A microscope having a frame, a stage on said frame, a body tube, an arm on which said body tube is secured, a bearing part on said arm cooperating with a corresponding bearing part of said frame for adjustment of said arm relatively to said frame to move said body tube toward and from said stage, said bearing part on said frame being formed in two portions spaced apart one above the other and both engaging the bearing part of said arm, a bearing block engaging said bearing part of said arm and being arranged between the two portions of said bearing part of said frame and frictionally held against movement relatively to said arm, a coarse adjustment mechanism for moving said arm relatively to said block against the frictional holding of said block on said arm, and a fine adjustment mechanism supporting said bearing block and adjustable to move said bearing block and arm together relatively to said frame.

3. In a microscope having a frame, a stage supported on said frame, a body tube, an arm on which said body tube is secured, said arm being slidably supported on said frame at the part thereof remote from the user, the combination of fine and coarse adjustment mechanisms arranged in the portion of the frame adjacent to the user, and motion transmitting means including parts extending substantially horizontally and arranged at a side of said stage for connecting both said fine and coarse adjustment mechanisms with said arm for adjusting the body tube relatively to the stage.

4. In a microscope having a frame, a stage supported on said frame, a body tube, an arm on which said body tube is secured, said arm being slidably supported on said frame at the part of the microscope remote from the user, the combination of fine and coarse adjustment mechanisms arranged in the portion of the frame adjacent to the user and below the level of the stage, and motion transmitting means arranged at both sides of the optical axis of the microscope for transmitting motion of said fine and coarse adjustment mechanisms to said arm.

5. A microscope having a frame including front and rear legs and hollow side frame members connecting the front and rear legs and spaced apart, a body tube carrying arm adjustably supported on said frame at the part of the microscope remote from the user, fine and coarse adjustment mechanisms located in the part of the microscope adjacent to the user, and means arranged in said hollow side frame members and connected with said fine and coarse adjustment mechanisms and said arm for transmitting motion of said fine and coarse adjustment mechanisms to said arm.

6. In a microscope, the combination of a frame, an arm carrying a body tube and having a pair of legs spaced apart and slidably mounted on said frame for vertical adjustment, coarse and fine adjustment mechanisms on the front portion of the base, a pair of bearing blocks, one slidably mounted on each of said legs, a shaft journalled in each bearing block and connected with said coarse adjustment mechanism to be rotated thereby, a pinion on the portion of each shaft remote from the user, rack bars on the legs of said arm for engagement with said pinions, a bifurcated lever having legs extending at opposite sides of the stage and supporting said bearing blocks, and means for swinging said lever by means of said fine adjustment shaft.

7. A microscope having a frame, a body tube supported on an arm having the lower portion thereof provided with a pair of legs spaced apart, bearings on said frame and said legs for vertical adjustment of said arm, a bearing block for each leg and each having a slidable connection with its leg, coarse adjustment mechanism for moving said legs relatively to said bearing blocks and including a coarse adjustment shaft arranged at the portion of said frame adjacent to the user of the microscope, a bifurcated lever having legs supporting said bearing blocks for raising and lowering the same, and a fine adjustment mechanism for swinging said lever.

8. A microscope having a frame, a stage on said frame, a body tube, an arm on which said body tube is mounted and having a pair of downwardly projecting legs, bearings on said frame for adjustment of said legs relatively to said frame for moving said body tube toward and from said stage, bearing blocks frictionally connected with said legs, a single fine adjustment mechanism supporting both of said bearing blocks and formed to move said blocks and said arm along said bearings, and a single coarse adjustment mechanism for moving both of said legs relatively to said bearing blocks.

9. A microscope having a frame including a front pedestal and a pair of rear legs spaced apart and having hollow frame members each connecting one rear leg with said pedestal, and spaced from each other, a stage between said frame members, a body tube supporting arm having legs at the lower portion thereof which are spaced apart and which are slidably mounted on the legs of said base, fine and coarse adjustment shafts journalled in the front end of said base, and means arranged in said hollow frame members for transmitting motion from said fine and coarse adjustment shafts to the legs of said arm.

10. A microscope in accordance with claim 9, characterized in that the means for transmitting motion from the coarse adjustment shaft are in the form of shafts arranged in said hollow frame members.

11. A microscope in accordance with claim 9, characterized in that the means for transmitting movement of the fine adjustment shaft to the arm is a bifurcated lever having arms in said hollow frame members.

12. A microscope including a frame, a body tube carrying arm having a pair of spaced legs at the lower portion thereof slidably mounted on said frame on the side remote from the operator for vertical adjustment, bearing blocks supported on said legs, a fine adjustment mechanism supporting said bearing blocks and moving the same vertically, and a coarse adjustment mechanism including parts journalled in said bearing blocks for adjusting said legs relatively to said blocks, fine and coarse adjustment shafts on the side of said frame near the operator, and connecting means between said shafts and said fine and coarse adjustment mechanisms.

13. A microscope including a frame, a body tube carrying arm having a pair of spaced legs at the lower portion thereof slidably mounted on said frame for vertical adjustment, bearing blocks supported on said legs, a fine adjustment mechanism supporting said bearing blocks and moving the same vertically, a coarse adjustment mechanism including parts journalled in said bearing blocks for adjusting said legs relatively to said blocks, a pair of concentrically arranged shafts, journalled on said frame, means connecting one of said shafts with said parts journalled in said bearing blocks to actuate said coarse adjustment, and other means connecting the other of said shafts with said fine adjustment mechanism.

14. A microscope including a frame, a body tube supporting arm having the lower portion thereof provided with spaced legs on the side of the microscope distant from the operator, bearings for said legs on said frame for movement of said arm to adjust said body tube, bearing blocks also having bearing connections with said legs and frictionally held against movement relatively to said legs, a single coarse adjustment mechanism for simultaneously moving both of said legs of said arm relatively to said bearing blocks, and a single fine adjustment mechanism for simultaneously moving both of said blocks with relation to said frame.

15. A microscope according to claim 14, in which the bearings are located in the rear of said frame and in which actuating devices for both fine and coarse adjustments are located in the front of said frame.

16. A microscope according to claim 14, in which the bearings are located in the rear of said frame and in which actuating devices for both fine and coarse adjustments comprise concentric shafts accessible from opposite sides of said frame and located in the front of the microscope below the level of the stage thereof.

17. A microscope according to claim 14, in which the bearings and bearing blocks are located at the rear of said frame and in which actuating devices for both fine and coarse adjustments are located in the front of the frame, said fine adjustment mechanism including a bifurcated lever having arms arranged at opposite sides of the optical axis of the microscope and the rear ends of which lever support said bearing blocks.

18. A microscope according to claim 14, in which the bearings and bearing blocks are located at the rear of said frame and in which actuating devices for both fine and coarse adjustments are located in the front of the frame, said fine adjustment mechanism including a bifurcated lever having arms arranged at opposite sides of the optical axis of the microscope and the rear ends of which lever support said bearing blocks, and pivots on which said lever is fulcrummed and which are located rearwardly of the middle portion thereof so that motion transmitted by said lever to said block will be less than that imparted to the front end of said lever.

19. A microscope including a frame, a stage mounted on said frame, a body tube, an arm carrying said body tube and movably mounted on the rear of said frame to move said body tube toward and from said stage, a pair of hollow coarse adjustment shafts journalled in the front portion of said frame and extending beyond the opposite sides thereof and having actuating devices mounted on the opposite outer ends thereof, a sleeve connecting said hollow coarse adjustment shafts and having a longitudinal slot, means operated by said coarse adjustment shafts and extending to the rear of said frame and connected with said arm for moving the same for adjustment of said body tube, a fine adjustment shaft extending through said hollow coarse adjustment shafts and having actuating buttons on the outer ends thereof and having a threaded part, a threaded nut cooperating with said threaded part and arranged within said slotted sleeve, a ring slidable on the exterior of said sleeve and connected with said nut through said slot, and means for transmitting motion of said ring to said arm for slow movement thereof independent of the movement imparted thereto by said coarse adjustment shafts.

20. A microscope including a frame, a stage mounted on said frame, a body tube, an arm carrying said body tube and movably mounted on the rear of said frame to move said body tube toward and from said stage, a bearing block slidably mounted on each arm, said bearing blocks being frictionally held against movement relatively to said arms, a rack on each arm, a pinion on each bearing block meshing with said rack, a pair of hollow coarse adjustment shafts journalled in the front portion of said frame and extending beyond the opposite sides thereof and having actuating devices mounted on the opposite outer ends thereof, a shaft extending forwardly from each pinion and having a universal joint therein, means on said coarse adjustment shafts for transmitting rotary motion thereof to said pinion shafts, and a fine adjustment mechanism including actuating means at the front of said frame and having means at the rear of said frame for moving said bearing blocks to move said arm and body tube.

21. In a microscope having a frame, a stage supported on said frame, a body tube supporting arm slidably mounted on said frame on a part thereof remote from the user, the combination of fine and coarse adjustment shafts journalled coaxially in a part of said frame adjacent to the user and extending crosswise of the microscope in fixed relation to said frame and rotatable from either side of the microscope, and motion transmitting means extending along a side of the stage from the part of the microscope adjacent to the user to the opposite part thereof for effecting fine and coarse adjustments of said arm.

HARVEY N. OTT.